Dec. 12, 1944.  G. H. KLAY ET AL  2,364,724
ELECTRICAL METER
Filed June 3, 1943  2 Sheets-Sheet 2
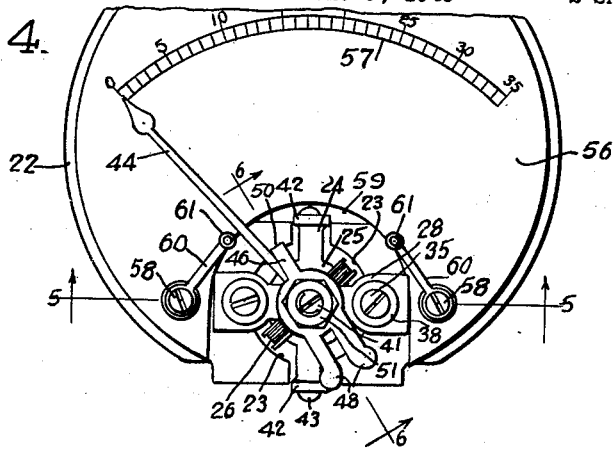
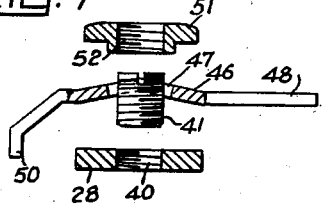
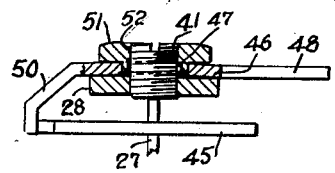
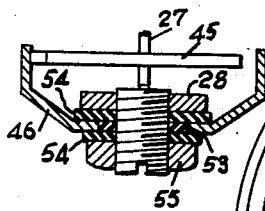
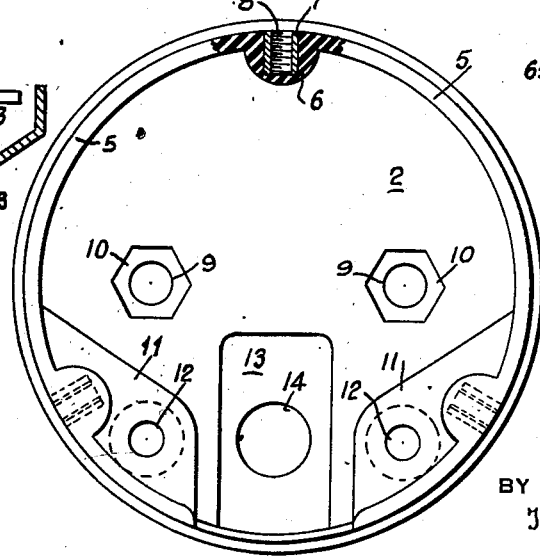
INVENTORS
GEORGE H. KLAY,
FREDERICK J. LINGEL,
BY Toulmin & Toulmin
ATTORNEYS Patented Dec. 12, 1944

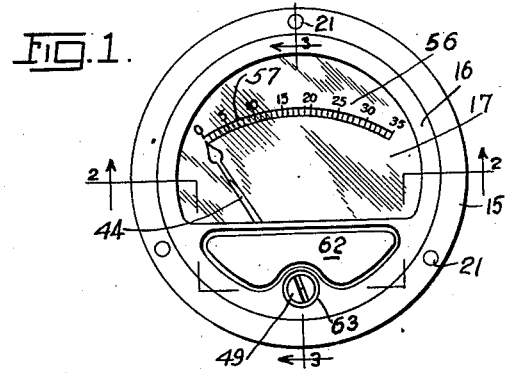
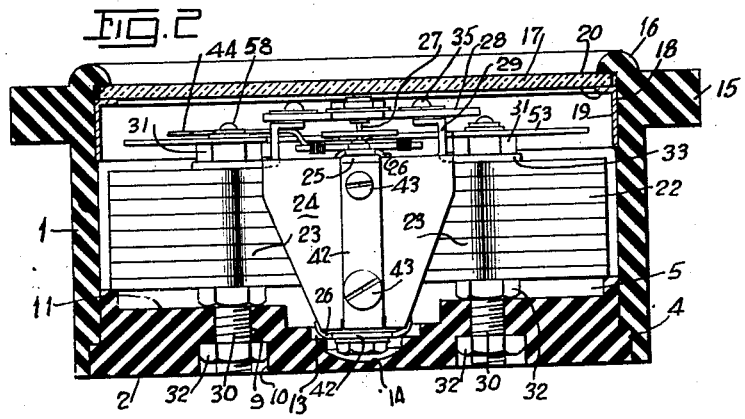
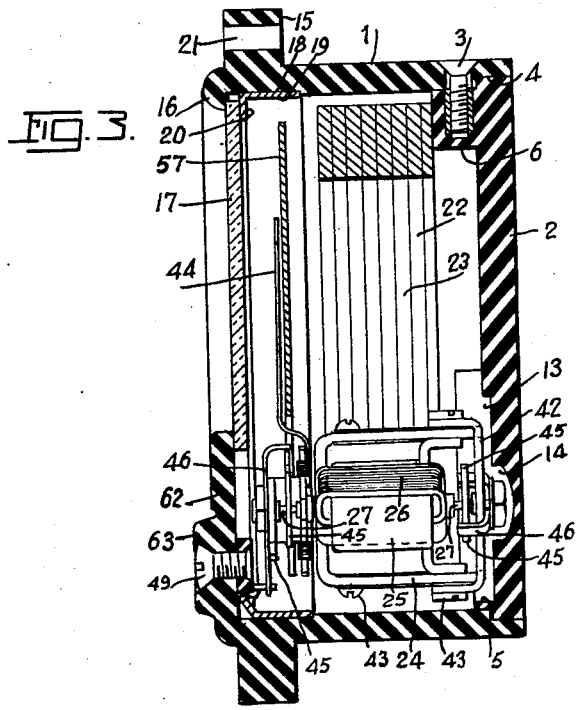

2,364,724

UNITED STATES PATENT OFFICE 2,364,724

ELECTRICAL METER

George H. Klay and Frederick J. Lingel, Bluffton, Ohio, assignors to The Triplett Electrical Instrument Co., Bluffton, Ohio, a corporation of Ohio Application June 3, 1943, Serial No. 489,454

7 Claims. (Cl. 171—95)

The present invention relates to electrical instruments and more particularly to improvements in ammeters, voltmeters, etc. with a view to rendering the construction more compact and simple in design.

In places where space and weight are important, for example in an airplane, it is necessary that the instruments shall be of minimum size, both in diameter and thickness, also of the lightest possible weight. The diametral size of an instrument is more or less fixed by the required size of the dial because if the instrument were made smaller, difficulty may be encountered in reading the scale index.

The primary object of the invention is to provide an instrument which is simplified to the extent that it employs fewer parts than the conventional structure with a consequent reduction in weight and in addition, the arrangement of the parts permits reduction in the thickness of the instrument case.

Other objects and features will be apparent when the specification is perused in connection with the accompanying drawings in which:

Figure 1 is a plan view of an instrument improved in accordance with the present invention.

Figure 2 is an enlarged sectional view of the instrument taken along line 2—2 in Figure 1 but showing the internal parts in elevation.

Figure 3 represents an enlarged sectional view taken along line 3—3 in Figure 1.

Figure 4 is a plan view of the instrument with the casing removed.

Figure 5 is a fragmentary sectional view taken along line 5—5 of Figure 4.

Figure 6 shows the improved zero set structure in section. This view is taken along line 6—6 in Figure 4.

Figure 7 is a view of the same structure shown in Figure 6 but with some of the parts removed from one another.

Figure 8 is a plan view looking into the interior of the back cover of the casing.

Figure 9 is a partial sectional view of a modified form of the upper bridge construction.

Figure 10 illustrates, in section, the lower bridge member of the instrument movement shown in Figures 4 and 5.

Referring more particularly to Figures 1, 2 and 3, reference numeral 1 designates a cylindrical member made of metal or insulating material such as hard rubber or a phenolic condensation product, the member being open at the top and provided with a closure member at the bottom designated 2. The cylindrical member or casing 1 is provided with a plurality of equidistantly positioned openings for receiving screws 3. The lower edge of the casing 1 is also provided with a turned-down shoulder portion 4 which provides a ledge for a corresponding shoulder on the closure plate. In order to center the latter within the casing 1, the plate is provided with an inwardly extending flange portion 5 having a diameter which fits snugly within the casing.

As shown in Figure 8, three equidistantly positioned lugs 6 or projections of a general semicircular shape are provided along the interior surface of the flange 5 and in each lug there is a radially extending opening which snugly receives a short piece of metal tubing 7. The bore of the tubing is threaded as indicated at 8. The threaded openings 8 register with openings in the casing for accommodating machine screws 3 in order to hold the closure plate 2 rigidly in position.

The interior surface of the plate 2 (as seen in Figure 8) is also provided with a pair of round openings 9 which may be surrounded by a countersunk hexagonal opening 10 for purposes which will appear hereinafter.

In order to stiffen the flat portion of the closure plate, reinforcing webs 11 may be provided and a pair of holes 12 drilled through these webs. A rectangularly shaped countersunk depression 13 is also provided in the interior of the closure plate, this depression being of a depth as to receive certain projecting parts of the instrument movement as will be explained hereinafter. At the center of the depression there may be provided a still deeper depression indicated at 14 of curvilinear shape at the bottom, this depression being also for the purpose of receiving one of the projecting parts of the movement as will appear hereinafter.

The casing 1 is provided with an annular projection 15 near the top which forms a shoulder for mounting the instrument on a panel board (not shown). The uppermost end of the casing is given a semi-circular shape 16 having a shoulder portion which overhangs the interior of the casing. This overhanging portion bears against a glass window 17 which is of somewhat smaller size than the casing interior and is inserted into the casing when the closure plate 2 has been removed. In order to retain the window in position, a turned-down groove 18 is formed on the interior of the casing, this groove being adapted to receive a metal ring 19 having an inwardly extending lip 20 on which the glass window rests.

The ring 19 may be formed of strip material and sprung into position. Openings 21 of which three have been illustrated are drilled through the flange 15 in order rigidly to secure the instrument to the panel by means of screws (not shown).

The movement proper includes a plurality of strongly magnetized laminations 22, eight as shown, these laminations terminating at positions adjacent the movable element in a pair of arcuate surfaces 23 which constitute pole faces for magnetically reacting with a movable coil which will be described presently. For supporting the movable element within the cylindrical opening formed between the ends of the pole pieces 22 an inverted U-shaped truss member 24 is provided. The front and back plates of this truss member take on a triangular shape with the small width of each triangular portion pointing downwardly as can be plainly seen in Figure 2.

There is secured to opposite sides of the truss member in any suitable and well known manner a solid cylindrical member 25 which is concentrically positioned within the circular opening formed between the opposite pole pieces. This member is provided mainly for the purpose of giving rigidity to the movement as a whole and more especially for assuring complete alinement between the oppositely disposed stub shafts on which the rotatable coil is mounted. This member 25 is the fixed cylinder for concentrating the field flux through the rotor windings. The coil is indicated at 26 and is wound on a band of insulating material which takes on a rectangular shape and is rotatably mounted in a manner as will be described hereinafter. The interior dimensions of the band are obviously such as to clear the stationary cylinder 25, and the coil 26 mounted thereon represents the rotor of the instrument. The coil 26 and the band on which it is mounted are carried at opposite ends on a pair of stub shafts 27 which are journalled in sapphire jewels carried by bridges which are positioned on opposite sides of the magnet assembly 22 as will be explained hereinafter. The front bridge is indicated at 28 and is supported in a plane parallel to the magnet assembly by means of S-shaped brackets 29, the lower portions of which are secured to the upper face of the magnet assembly in any suitable manner. The magnet assembly is held together, at least partly by means of a pair of bolts 30 which extend beyond the upper and lower surfaces of the assembly, these bolts being received by the openings 9 in the closure member 2. The upper and lower ends of the bolts are threaded to receive a nut 31 at the upper end and a pair of nuts 32 at the lower end, the latter being spaced apart by the thickness of the closure plate at the position of the openings 9.

The U-shaped truss 24 is provided with a pair of oppositely positioned wing portions 33 having openings which receive the upper end of the bolts 30 and interposed between the nuts 31 and the upper surface of the magnet assembly. Thus tightening the nuts 31 will rigidly hold the truss 24 in position. The lower or horizontal portions of the brackets 29 may also be secured in position by providing openings which receive the bolts 30 so that the tightening of the nuts 31 will also fixedly secure the brackets in position. The upper end of the brackets 29 may be secured to the bridge member 28 in a manner which has been illustrated in Figure 5. Each bracket is provided at its uppermost portion with a threaded opening for receiving the shank of a round headed screw 35. The bridge member 28 is provided with openings which register with the screws 35 so that the member may be firmly secured to the brackets.

The bridge 28 is provided with a threaded opening 40 at a position directly above the shaft 27. This opening is adapted to receive a setscrew 41 having a counterbored hole which contains a jewel bearing (not shown). At the lower end of the movement, the lower shaft 27 is also journalled in a jewel bearing, this bearing being formed of a setscrew (not shown) secured to a strap member 42 (Figures 2 and 3) which spans the lower ends of the truss 24 and has extensions extending upwardly over the outer surfaces of the sides of the truss to which they are secured by the screws 43 (Figure 2).

A pointer 44 formed of a narrow and thin strip of metal may be carried by the upper shaft 27 at a suitable position between the upper bridge and the upper surface of the band on which the coil 26 is mounted. The arrangement is such that as the coil and its support rotate on shafts 27 about the solid cylinder 25, the pointer 24 gives a direct indication of the circular angle through which the coil moves.

It is necessary that a constant drag be exercised on the pointer 44 so that the pointer will move only gradually throughout its range and for this purpose, a torsional spring 45 is provided about each of the shafts 27. The inner ends of these springs are secured to the respective shafts and the outer ends are anchored to a pair of horizontally disposed levers 46 which are provided with relatively large openings 47 about the setscrews 41. One end of the upper lever 46 terminates in bifurcated portions 48 which cooperate with a screw 49 extending through the cover of the casing in such a way that by turning the screw the lever 46 may be rotated about the setscrew 41. The other end of the lever 46 terminates in a downwardly extending portion 50 to which the outer end of the spiral spring 45 is secured. Thus when the lever 46 is rotated, the spring 45 is placed under greater or less tension depending on the direction in which the lever is turned so that the torsional force against which the dial 44 has to move during its excursions across the instrument can be controlled.

It is apparent that the screw 49 serves the purpose of a so-called "zero set" in that in addition to effecting a change in the torsional strength of the spring, the movements of the screw also control the initial position of the outer end of the spring and therefore of the zero position of the pointer.

There is a torsion control structure provided for the rear spiral spring 45 which is similar to the upper structure including the lever 46 except that the bifurcations 48 need not be provided since there is no zero-set screw at this position.

In order to secure the upper lever 46 to its bridge member, a nut 51 may be provided which threadingly engages the setscrew 41. Each nut is provided with a shoulder portion 52 of a size as loosely to fit into the concentric opening 47 which immediately surrounds each bearing setscrew 41 as can be seen in Figures 6 and 7. The nut 51 is tightened after the lever 46 has been adjusted to a position as will give the proper torsional force to the spiral spring. Some form of a yieldable contact must be provided between the nut 51 and the lever 46 in order that the lever may be rotated slightly about the set-screw 41 when the external screw 49 is turned. Yet the lever must be sufficiently tight on the bridge so as to have an absolutely fixed position when the zero set screw 49 is not operated.

Whereas in the prior art, the flexible connection between the nut 51 and the lever 46 was usually obtained by means of a spring washer, we have found that the washer can be entirely eliminated and the lever 46 can be given an upwardly dished shape as shown in Figure 7 at the position of the setscrew 41 so that as the nut 51 is tightened the bent up portion of the lever is continually being subjected to a straightening effect. The lever 46 never attains a completely flat condition when the nut 51 is fully tightened as shown in Figure 6 so that excessive friction can never be present between the lever and the nut. The fact that the lever retains to some extent its dished-up shape, thus pressing tightly against the nut 51, provides sufficient friction against turning of the lever and yet allows the latter to be rotated by rotating the zero set screw 49.

The manner in which the lower lever 46 is secured to the lower bridge member 28 is illustrated in Figure 10. As shown, the lower lever 46 is provided with an opening which is considerably larger than the set screw 41 so as to retain an insulating washer 53. There is also a pair of insulating washers 54 positioned on each side of the washer 53 and therefore interposed between a nut 55 and the bridge 28. Thus the lever 46 which is electrically connected to one end of the coil 26 through the spring 45 is insulated from the lower bridge 28 and therefore from the immediately connected structure including the magnets.

In practice, the opposite ends of the coil 26 are connected respectively through the shafts 27 to the respective springs upper and lower 45. Inasmuch as the front spring 45 is electrically connected to the upper bridge 28, a leading-in conductor for the coil may be secured to the bridge at any suitable place, for example, at one of the screws 35. However, the leading-in conductor for the opposite end of the coil would necessarily have to be attached to the lower lever 46 rather than the lower bridge because as pointed out hereinbefore, the bridge is insulated from the lower lever.

In order to give accurate indication of the annular movements of the pointer 44, a dial face 56 may be provided with an arcuate index 57 stamped thereon. The dial may be secured in any suitable manner to the bolts 30, for example, the upper ends of the bolts may be drilled and tapped to receive screws 58 which clamp the dial plate to the upper surfaces of the bolts 30. It is apparent that due to the vertical position of the dial plate with respect to the elements of the instrument movement, the plate must be provided with a cut-away portion 59 to clear these elements. In addition to holding the dial plate in position, the screws 58 also support a pair of angularly extending arms 60 which terminate in prongs 61, the latter being in line with the pointer 44 so as to limit the swinging movement of the pointer at each end of its straddle.

In accordance with another feature of the present invention, the upper portion of the casing 1 is provided with an extension 62 of the same material as the casing and which extends over the entire width of the movement as shown in Figure 3, thus obscuring the movement from view. The window 17 is given a cut-off straight edge at the extension 62 and may if desired be glued or in any other manner secured to the underside of the extension. The zero set screw 49 is accommodated by a thickened portion indicated at 63 of the extension 59 into which the screw is threaded.

The elimination of the glass thickness directly over the mechanism provides for additional space and therefore helps to decrease the overall thickness of the meter. The use of the straight cut on the glass also simplifies the shaping operations of this piece by eliminating the drilling of a hole or grinding of a slot for the zero adjuster screw as is necessary on other designs.

It has been pointed out that by providing a bent up portion on the lever 46, the usual spring washer may be discarded and a yielding connection can still be obtained. The elimination of this spring washer of which there would be one provided at each side of the movement permits a reduction in the thickness of the movement as a whole so that the instrument may be made thinner than those of the prior art.

Another feature is provided in accordance with the principles of the present invention to reduce still further the thickness of the instrument in its casing and that is the presence of the depressions 13, 14 formed in the lower casing cover illustrated in Figure 8. These depressions are of a shape, size and depth as to accommodate all of the various parts found in the lower end of the instrument movement including the lower nut 51, the lower lever 46 and the lower strap or bridge member 42. By providing a well or depression effect in the lower closure plate, the plate is permitted to have considerable thickness in order rigidly to support the bolts 30 and without adding to the thickness of the casing. This matter of thickness of the casing is of extreme importance in case the instrument is intended to be used where space is at a premium, for example in airplanes, portable radio sets etc.

It has been pointed out that the coil 26 is electrically connected not only to the top bridge member 28 through the upper spring 45 but also to the magnet assembly 22. However, it may be desirable under certain conditions to insulate the top bridge member and the coil from the magnet and a structure of this type is illustrated in Figure 9. It will be noted that each bracket 29 carries a thin insulating washer 64 about each of the screws 35 on which the top bridge member 28 rests. The latter is provided with a large opening 65 at the position of each screw and a ring 66 of insulating material is fitted in this opening. Finally, a washer 67 of insulating material is laid on the ring 66 and this washer receives the head of the screw 35. It is therefore apparent that the top bridge member 28 is electrically insulated from the upper portion of each bracket 29 so that the coil 26 is completely electrically insulated from the magnet assembly 22. A leading-in conductor can still be connected to the screw 35 in order to make electrical contact with one end of the coil 26 as in the embodiment of the invention described previously.

It will be understood that I desire to comprehend within my invention such modifications as come within the scope of the claims and the invention.

Having thus fully described our invention, what we claim as new and desire to secure by Letters Patent is:

1. An electrical measuring instrument comprising a casing containing a dial, a pointer for moving over said dial and an actuating element to which the pointer is secured, said casing being provided with a window positioned near the top of the casing through which the movements of the pointer may be observed, said window extending over the casing but terminating short of the area subtended by said actuating element, a magnet means having pole pieces, means for supporting said actuating element including an inverted U-shaped member with the open end of the U located adjacent said window and to one side thereof, and the sides of the U-shaped member closing the sides of the space formed by said pole pieces.

2. An electrical measuring instrument comprising a casing containing an actuating movement, a pointer secured thereto and adapted to move over a dial, said casing including an opaque portion which extends over the entire area subtended by said movement and a transparent portion adjacent said opaque portion through which the pointer can be observed, said casing having a greater internal width at the position of said opaque portion than at the position of said transparent portion in order to accommodate said movement, a magnet means having pole pieces, means for supporting said actuating movement including an inverted U-shaped member with the open end of the U located adjacent said transparent portion and to one side thereof, and beneath said opaque portion, and the sides of the U-shaped member closing the sides of the space formed by said pole pieces.

3. An electrical measuring instrument comprising a casing containing an actuating movement, a pointer secured thereto and adapted to move over a dial, said casing including a portion which extends over the entire area subtended by said movement, said casing and said portion being constituted of the same opaque material, and a window adjacent said portion through which the pointer can be observed, said casing having a greater width at the position of said portion than at the position of said window in order to accommodate said movement, a magnet means having pole pieces, means for supporting said movement including a U-shaped member with the open end of the U located adjacent said window and to one side thereof, and beneath said portion, and the sides of the U-shaped member closing the sides of the space formed by said pole pieces.

4. An electrical measuring instrument comprising a casing containing a dial, a pointer and an actuating element including a coil, said pointer being secured at its ends to stub shafts which are journalled in bearings, upper and lower bridge member for carrying said bearings, said upper bridge member being in electrical contact with said coil and said lower bridge member being insulated from said coil, a magnet means having pole pieces, means for supporting said dial, pointer and actuating element including an inverted U-shaped member with the open end of the U located adjacent said pointer and the sides of the U-shaped member closing the sides of the space formed by said pole pieces.

5. An electrical measuring instrument comprising a casing containing a dial, a pointer and an actuating element including a coil, said element being carried at its ends on stub shafts which are journalled in bearings, upper and lower bridge members for supporting said bearings, levers pivotally mounted on said bridge members and torsion springs connected between said levers and said stub shafts for setting the initial position of said actuating element, the upper lever being electrically connected to the upper bridge member and the lower lever being insulatingly mounted on said lower bridge member, a magnet means having pole pieces, means for supporting said dial, pointer, actuating element, bearings, and upper and lower bridge members, including an inverted U-shaped member with the open end of the U located adjacent said pointer and the sides of the U-shaped member closing the sides of the space formed by said pole pieces.

6. An electrical measuring instrument comprising a casing containing an actuating element mounted on a shaft being journalled in a jewel bridge extending across the movement and insulated from all the metal parts of the movement, a magnet means having pole pieces, means for supporting said actuating element and jewel bridge including an inverted U-shaped member with the open end of the U located adjacent said jewel bridge and the sides of the U-shaped member closing the sides of the space formed by said pole pieces.

7. An electrical measuring instrument comprising a casing containing an actuating element mounted on a shaft and including a dial and a pointer, said element comprising a coil of wire which is adapted to rotate on said shaft between the poles of a permanent magnet, said shaft being journalled in a metal bridge member which is insulatingly secured to said permanent magnet whereby the bridge member is adapted to serve as one of the leading-in conductors for said coil, a magnet means having pole pieces, means for supporting said shaft and metal bridge member including an inverted U-shaped member with the open end of the U located adjacent said bridge member and the sides of the U-shaped member closing the sides of the space formed by said pole pieces.

GEORGE H. KLAY.
FREDERICK J. LINGEL.